US009424432B2

(12) United States Patent
Holland et al.

(10) Patent No.: US 9,424,432 B2
(45) Date of Patent: Aug. 23, 2016

(54) SYSTEMS AND METHODS FOR SECURE AND PERSISTENT RETENTION OF SENSITIVE INFORMATION

(71) Applicants: Nasdaq, Inc., New York, NY (US); AMAZON TECHNOLOGIES, INC., Reno, NV (US)

(72) Inventors: Ryan Christopher Holland, Seattle, WA (US); Thomas C. Stickle, Saint James, NY (US); Malcolm Gary Lafever, Lyons, CO (US); Edward Scott Mullins, New York, NY (US)

(73) Assignees: Nasdaq, Inc., New York, NY (US); Amazon Technologies, Inc., Reno, NV (US)

( * ) Notice: Subject to any disclaimer, the term of this patent is extended or adjusted under 35 U.S.C. 154(b) by 264 days.

(21) Appl. No.: 14/032,715

(22) Filed: Sep. 20, 2013

(65) Prior Publication Data
US 2014/0082749 A1 Mar. 20, 2014

Related U.S. Application Data

(60) Provisional application No. 61/703,429, filed on Sep. 20, 2012.

(51) Int. Cl.
*G06F 21/60* (2013.01)
*G06F 21/64* (2013.01)

(52) U.S. Cl.
CPC .............. *G06F 21/60* (2013.01); *G06F 21/645* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,249,251 | B2* | 7/2007 | Todd | G06F 21/604 |
| | | | | 707/E17.01 |
| 2002/0069155 | A1* | 6/2002 | Nafeh | G06Q 40/04 |
| | | | | 705/37 |
| 2002/0078355 | A1* | 6/2002 | Samar | G06F 21/6218 |
| | | | | 713/176 |
| 2002/0143686 | A1* | 10/2002 | Greene | G06Q 20/10 |
| | | | | 705/37 |
| 2003/0078880 | A1* | 4/2003 | Alley | G06F 21/645 |
| | | | | 705/38 |
| 2004/0162876 | A1* | 8/2004 | Kohavi | G06F 17/30943 |
| | | | | 709/203 |
| 2004/0203668 | A1* | 10/2004 | Bowne | G06Q 20/102 |
| | | | | 455/414.1 |
| 2005/0097260 | A1* | 5/2005 | McGovern | G06F 3/0623 |
| | | | | 711/100 |
| 2005/0108435 | A1* | 5/2005 | Nowacki | H04L 51/066 |
| | | | | 709/246 |
| 2005/0177591 | A1* | 8/2005 | Kanda | G06F 17/30067 |
| 2005/0192830 | A1* | 9/2005 | Pugh | G06F 21/6245 |
| | | | | 705/320 |

(Continued)

*Primary Examiner* — Taghi Arani
*Assistant Examiner* — Phy Anh Vu
(74) *Attorney, Agent, or Firm* — Nikon & Vanderhye P.C.

(57) ABSTRACT

An information processing system provisions a client account for a user to enable a client computer associated with the user to store information in an elastic storage system and to prohibit the client computer, the information processing system, and the elastic storage system from altering and from deleting the stored information during an authorized retention period. Data messages are received from one or more client computers and include information that is required to be stored for the authorized retention period. That information is transmitted via one or more data communications networks to the elastic storage system for storage so that the stored information is non-rewriteable and non-erasable during the authorized retention period. The secure data center receives the retrieved copy and provides it to the user device. The elastic storage system permits deletion, modification, or destruction of the stored information only when a trusted independent third party having predetermined authentication information associated with the client account provides the predetermined authentication information to the elastic storage system.

29 Claims, 5 Drawing Sheets

(56) References Cited

U.S. PATENT DOCUMENTS

| | | | |
|---|---|---|---|
| 2005/0195660 A1* | 9/2005 | Kavuri | G06F 3/0605 365/189.05 |
| 2005/0210041 A1* | 9/2005 | Taguchi | G06F 3/0605 |
| 2005/0240636 A1* | 10/2005 | Shitomi | G06F 17/30188 |
| 2005/0278787 A1* | 12/2005 | Naslund | G06F 21/10 726/26 |
| 2005/0283833 A1* | 12/2005 | Lalonde | G06F 21/566 726/22 |
| 2006/0085487 A1* | 4/2006 | Hara | G06F 17/30188 |
| 2006/0123232 A1* | 6/2006 | Cannon | G06F 3/0623 713/165 |
| 2006/0156382 A1* | 7/2006 | Motoyama | G06F 21/6209 726/1 |
| 2006/0200700 A1* | 9/2006 | Malcolm | G06F 17/30085 714/38.1 |
| 2006/0282669 A1* | 12/2006 | Legg | G06F 21/62 713/171 |
| 2007/0079146 A1* | 4/2007 | Hsu | G06F 21/6218 713/194 |
| 2007/0112784 A1* | 5/2007 | Blumenau | G06F 17/30082 |
| 2007/0136180 A1* | 6/2007 | Salomon | G06Q 40/04 705/37 |
| 2007/0174565 A1* | 7/2007 | Merrick | G06F 17/30085 711/161 |
| 2007/0192248 A1* | 8/2007 | West | G06Q 20/108 705/42 |
| 2007/0255770 A1* | 11/2007 | Murase | G06F 3/0605 |
| 2008/0172563 A1* | 7/2008 | Stokes | G06F 21/80 713/193 |
| 2008/0196101 A1* | 8/2008 | Sade | G06F 21/41 726/22 |
| 2009/0132774 A1* | 5/2009 | Bondurant | G06F 3/0605 711/161 |
| 2010/0070698 A1* | 3/2010 | Ungureanu | G06F 17/30067 711/108 |
| 2010/0212017 A1* | 8/2010 | Li | G06F 21/57 726/26 |
| 2011/0033050 A1* | 2/2011 | Maller | G06Q 30/02 380/259 |
| 2011/0093471 A1* | 4/2011 | Brockway | G06F 17/30616 707/747 |
| 2011/0106773 A1* | 5/2011 | Smith | G06Q 10/10 707/694 |
| 2011/0265176 A1* | 10/2011 | Khosrowpour | G06F 12/1458 726/19 |
| 2012/0159041 A1* | 6/2012 | Saxena | G06F 21/79 711/103 |
| 2012/0179646 A1* | 7/2012 | Hinton | G06F 17/30557 707/607 |
| 2012/0191980 A1* | 7/2012 | Kennedy | G06F 21/6236 713/183 |
| 2013/0042106 A1* | 2/2013 | Persaud | G06F 21/606 713/165 |

* cited by examiner

SYSTEMS AND METHODS FOR SECURE AND PERSISTENT RETENTION OF SENSITIVE INFORMATION

PRIORITY APPLICATION

This application claims priority from U.S. provisional application Ser. No. 61/703,429, filed on Sep. 20, 2012, the contents of which are incorporated herein by reference.

BACKGROUND

A major burden for many legal entities is the requirement to maintain documents and data and make these available for compliance auditing purposes.

For example, Securities and Exchange Commission ("SEC") Rules 17a-3 and 17a-4 (and subsequent clarifying releases) specify that the majority of fixed content information generated by broker-dealers must be retained as the official record resulting from business transactions and events. Taken in combination, these rules specify either time-based or event-based retention periods, depending on the type of record stored, as well as acceptable means and procedures associated with storing this data. Time-based retention periods are fixed in length and start at the time the record is created/stored. Event-based retention periods are variable in length with an initial period running continuously from the time the record is created/stored until a specific event occurs, then retained for an additional (typically fixed) period of time after the event.

The SEC rules require: "that electronic records are capable of being accurately reproduced for later reference by maintaining the records in unalterable form." In other words, records and documents must be preserved exclusively in a non-rewriteable, non-erasable format. The rules further clarifies that certain implementations of rewriteable and erasable media, such as magnetic disk or magnetic tape, would meet the requirements of a non-erasable, non-rewriteable recording environment provided they deliver i) the prescribed functionality, and ii) that functionality is delivered via appropriate integrated control codes for the designated retention schedule associated with the stored record. Moreover, "A broker-dealer would not violate the requirement in paragraph (f)(2)(ii)(A) of rule 17a-4 if it used an electronic storage system that prevents the overwriting, erasing, or otherwise altering of a record during its required retention period through the use of integrated hardware and software control codes."

Thus, in order to comply with Rule 17a-4, all mediums (e.g., paper, microfiche, optical disk, tape or any other storage means) must provide Write Once Read Many ("WORM") capabilities to prevent deletion or modification of data and must take steps to ensure that any acts of outright destruction be highly visible (e.g., deletion of consecutively numbered pages of written documents or efforts to tamper with records on an optical disk via mechanical or electrical interference) as willful attempts to violate the Rule.

In the case of an audit, any legal entity operating in the financial market may be requested to show that its actions conform to the provisions of the regulation, and/or other laws, rules, or regulations. To meet this request, the legal entity will have to retain records of information and/or documents relating to its actions over long periods of time, e.g., three to ten years. Other periods may apply. Given these long periods of time, a huge amount of data will need to be retained and kept available and accessible.

Thus, one issue of legal entities operating in the finance industry is complying with the requirements of collecting, organizing and maintaining documents in a long term storage system in a cost efficient and accessible fashion.

SUMMARY

Consequently there is a need for a regulatory records retention ("R3") storage system and storage method that provides non-rewriteable and non-erasable storage for recording, protecting and providing access to "fixed content" information, i.e., content that is not intended to be and should not be revised or deleted prior to the expiration of its authorized retention period ("life of data") and, where applicable, its release from a legal or regulatory hold.

In a non-limiting, example embodiment, a computer-implemented method provides for persistent storing of data in an information processing system including one or more data processors. The method comprises:

provisioning, by the information processing system, a client account for a user to enable a client computer associated with the user to store information in an elastic storage system and to prohibit the client computer, the information processing system, and the elastic storage system from altering and from deleting the stored information during an authorized retention period;

receiving at the information processing system data messages sent via one or more communications networks from one or more client computers, the received data messages including information that is required to be stored for the authorized retention period;

transmitting, from the information processing system, the received information via one or more data communications networks to the elastic storage system for storage so that the stored information is non-rewriteable and non-erasable during the authorized retention period; and in response to an authorized access request from an authorized computer device, the information processing system transmitting a retrieval request message to the elastic storage system via the one or more communication networks to retrieve a copy of the information stored in the elastic storage system. The provisioning step includes the information processing system configuring the elastic storage system to permit deletion, modification, or destruction of the stored information only when a trusted third party having a predetermined authentication information associated with the client account provides the predetermined authentication information to the elastic storage system. The trusted third party is an entity independent from and not controlled by the user, the information processing system, or the elastic storage system.

The predetermined authentication information may be for example a multi-factor authentication token. The client device, the information processing system, and the elastic storage system do not include or have access to the predetermined authentication information.

In one example application, the information is financial information and the information processing system ensures that the financial information is processed and stored in compliance with Securities and Exchange Commission (SEC) Rule 17a-4. In another example, the information processing system ensures that the financial information is processed and stored in compliance with Commodity Futures Trading Commission (CFTC) Rule 151.

In an example implementation, the elastic storage system is a cloud-based storage system accessible over the one or more communications networks. The information processing system is operated by a financial services entity and the cloud-based storage system is operated by different entity that provides shared computing and storage services to achieve economies of scale.

The information is preferably encrypted and then provided to the elastic storage medium to facilitate secure persistent storage of the information. The information is preferably received encrypted based on one or more first encryption keys associated with the user and the client computer. In that situation, the method further comprises decrypting the received information based on the one or more first encryption keys, re-encrypting the decrypted information based on one or more second different encryption keys, transmitting the information encrypted with the one or more second different encryption keys to the elastic storage system for storage in encrypted format.

The information may for example be related to financial articles of trade that are tradable on one or more financial markets and including emails, user statements, trade confirmations, memos, electronic log files, PDF files, or instant messages.

In an example implementation, a date or time of storage of the information in the elastic storage system is stored, and the stored date or time is linked to the information.

In an example implementation, the retrieving step is performed as part of an audit of the client account.

In an example implementation, the method further comprises storing in a database metadata linked to the information, accessing metadata from the database that is potentially relevant to the authorized request in response to the authorized request, and using the accessed metadata for retrieval of the copy of the information stored in the elastic storage system. The metadata may include a unique identifier associated with the information and a date or time of storage of the information in the elastic storage system.

In an example implementation, the method may include tracking in a log file information and activities associated with the information in the information processing system and in the elastic storage system.

A non-transitory, computer-readable storage medium may store computer-readable code which, when executed by a computer, performs the method(s) above.

In a non-limiting, example embodiment, a regulatory records retention system includes a secure information processing system operatively coupled to a flexible data storage platform and configured to receive data from end-users. One or more data processors are configured to communicate with a client computer associated with a user, to communicate with a cloud computing and storage platform via a communications network. The one or more data processors are configured to:

provision a client account for the user to enable the client computer to store information in an elastic storage system and to prohibit the client computer, the information processing system, and the elastic storage system from altering and from deleting the stored information during an authorized retention period;

receive data messages sent via one or more communications networks from one or more client computers, the received data messages including information that is required to be stored for the authorized retention period;

transmit the received information via one or more data communications networks to the elastic storage system for storage so that the stored information is non-rewriteable and non-erasable during the authorized retention period;

in response to an authorized access request from an authorized computer device, retrieve a copy of the information stored in the elastic storage system. The one or more data processors configure the elastic storage system to permit deletion, modification, or destruction of the stored information when a trusted third party having predetermined authentication information associated with the client account presents the predetermined authentication information to the elastic storage system. The trusted third party is an entity independent from and not controlled by the user, the information processing system, or the elastic storage system.

In a non-limiting, example embodiment, a financial information processing system is provided for querying trading-related data and eligible documents and generating reports based on thereon. The system includes a secure data center including one or more data processors configured for communication with user communication devices, a cloud computing and storage platform including a shared infrastructure of multiple computing and storage resources connected by one or more networks and providing shared services, and one or more data communications networks providing data communication between the secure data center and the cloud computing and storage platform. The secure data center is configured to:

provision a client account for the user to enable the computer to store financial information in the cloud computing and storage platform and to prohibit user communication devices, the secure data center, and the cloud computing and storage platform from altering and from deleting the stored financial information during an authorized retention period;

receive data messages sent via one or more communications networks from one or more client computers, the received data messages including financial information that is required to be stored for the authorized retention period;

transmit the received information via the one or more data communications networks to the cloud computing and storage platform;

transmit a retrieval request message for the stored financial information to the cloud computing and storage platform via the one or more data communications networks in response to an authorized access request from an authorized user communication device.

The cloud computing and storage platform is configured to:

store the financial information transmitted by the secure data center in memory that is non-rewriteable and non-erasable during the authorized retention period;

retrieve a copy of the stored financial information in response to receiving the retrieval request message;

receive a request to delete, modify, or destroy the stored financial information, and if that request is accompanied by a predetermined authentication token associated with the client account and entrusted to a third party, then to perform the requested deletion, modification, or destruction of the stored financial information, The third party is an entity independent from and not controlled by users, the secure data center, or the cloud computing and storage platform.

DETAILED DESCRIPTION

Figure 1:
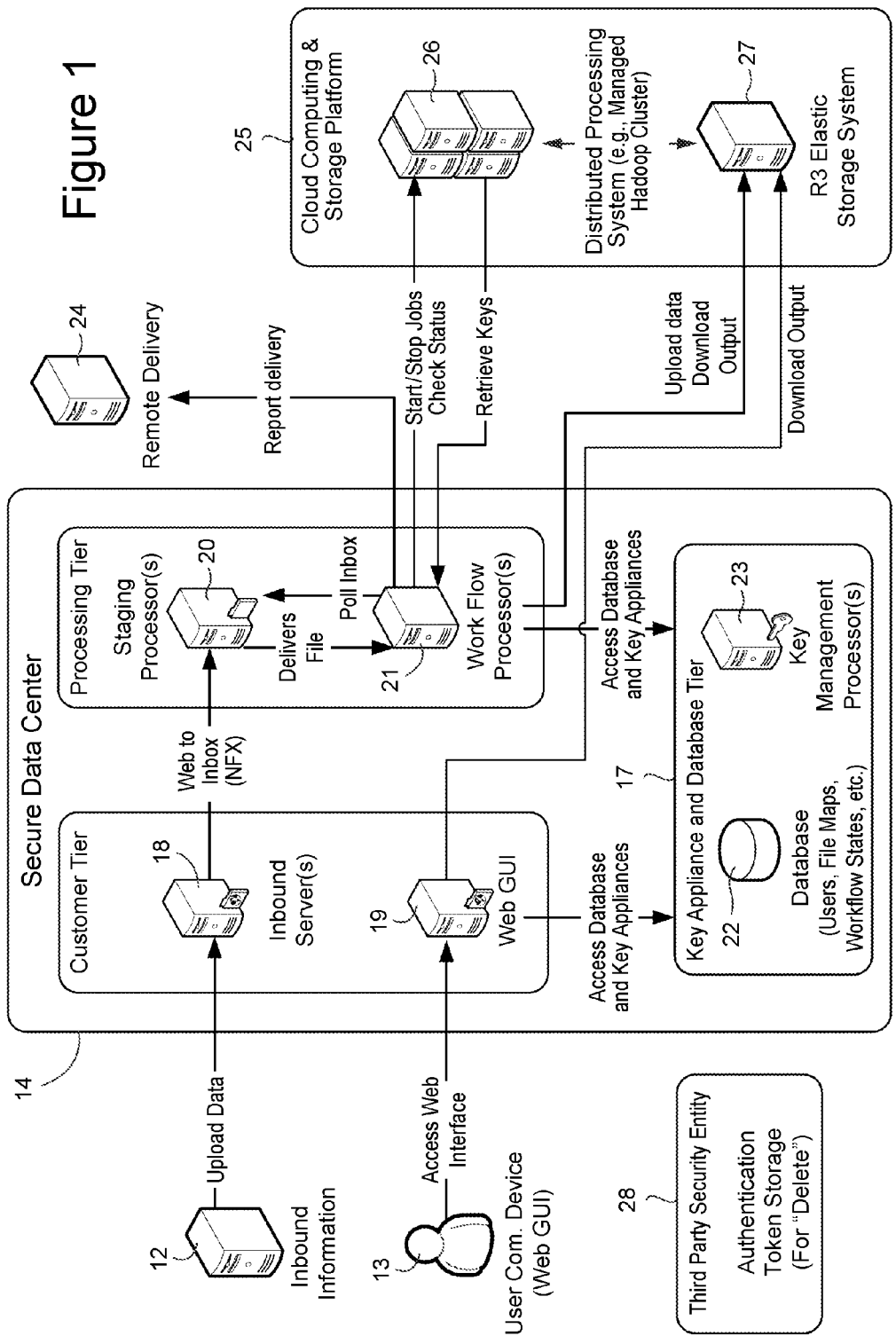
FIG. 1 is a diagram of a non-limiting example embodiment of a secure and persistent financial data storage and retrieval system.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., one or more processors and those input devices and output devices that are appropriate to perform the process.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways.

The technology described below provides data management, computing and reporting services designed to meet demanding security, reliability, and privacy needs. One example application for this technology is regulated financial market participants, and therefore, the information in the examples below refers to financial information. However, the technology may be applied to other types of information for which security, reliability, and privacy are desired.

Non-limiting example embodiments combine the scale and functionality of a cloud computing and storage platform and services with additional security and privacy mechanisms that meet specific compliance and business challenges of financial market participants. The example embodiments use advanced, financial securities exchange-grade encryption and key management along with an array of security features and certifications provided by the cloud computing and storage platform. All users must communicate with the cloud computing and storage platform utilizing one or more secure data centers (e.g., SSAE-16 certified data centers). Financial information is encrypted, indexed, and auditable on the cloud-based storage medium. Within the cloud environment, each user's financial information may be segregated using virtual private cloud technology, rigorous access control methods and firewalls to impose high levels of security and privacy.

The technology provides a data storage solution that meets the requirement for preserving financial information records in a non-rewriteable and non-erasable format by protecting each record or file from being overwritten or erased either permanently or in accordance with a specified retention period. Another application of the technology is to protect financial information records subject to a legal/litigation hold command until that hold command has been released—even if a previously specified retention period for those records has expired.

As mentioned above, the technology leverages a highly scalable and durable cloud-based processing and storage platform that can be configured to support a wide range of storage requirements. Various example embodiments of the technology provide advantages over other storage mediums like paper, microfiche, optical disk and tape including superior durability, availability and accessibility at substantially reduced cost.

The cloud-based processing and storage platform features secure repositories of data which are written to once for input, are capable of being read (or copied) multiple times as output, but cannot be deleted or modified for the life of the prescribed retention period of each record. These features are provided through the combination of control mechanisms including: a strict role-based permission system, software controls including access control parameters, firewalls, and audit and integrity verification systems, hardware controls in the form of authentication tokens, such as multi-factor authentication ("MFA") control keys, and an encryption/key management system with hardware elements.

Different rights are granted to four categories of entities discussed below. The four entity categories include: (1) users or customers, (2) one or more secure data centers, (3) an independent third party escrow entity or agent, and (4) the cloud-based processing and storage platform. A "federated" permission system is preferably used where each entity may only perform a limited set of operations—"directly related to that entity's explicit need and purpose. Significantly, the system ensures that no one entity has the ability to modify or delete the data maliciously or accidentally, even in the case of collusion. For example, preferably only secure data center administrative users can initiate a delete action following a procedure including obtaining tokens from the third party escrow agent as described below.

The following is a description of each entity and an example of its level of permission. User or customers submit to and retrieve files from the cloud-based processing and storage platform as needed. Users do not have permission to directly interact with stored data on the cloud-based processing and storage platform. Rather, users must communicate with the cloud-based processing and storage platform which enables them to access but not delete records stored therein. A secure data center preferably maintains a client or customer account for each distinct client for the purposes of recording new data to the cloud-based processing and storage platform and retrieving/reading stored data on the cloud-based processing and storage platform. The client or customer account is provisioned to write financial information once into the cloud-based processing and storage platform and to read/copy that stored financial information multiple times. However, a client or customer account is not permitted to delete financial information stored in the cloud-based processing and storage platform. An escrow entity or agent is an independent third-party that stores and maintains physical authorization information, e.g., multi-factor authorization (MFA) tokens, required to delete data from the cloud-based processing and storage platform, e.g., only in the event of a cessation of the Books & Records relationship or the expiration of the useful life of the data that has been stored. The client or customer account is provisioned with read and write privileges but not delete privileges. Additional protection is achieved by having the escrow account uses a hardware authentication key to physically perform requested delete functions. The cloud-based processing and storage platform manages a purge function that exists for the purpose of deleting data that a client is no longer required to retain or desires to retain. After a mandated regulatory or specified retention period has expired, a user may elect to copy data to an alternate storage medium. After this optional copy procedure is complete, the purge function in the cloud-based processing and storage platform removes expired files. The purge function may only delete and cannot write new files or read/copy existing files in order to prevent use of the delete function on non-expired records.

As an example, the secure data center maintains a separate electronic client or customer account for each customer or user, e.g., each broker-dealer. The cloud-based processing and storage platform issues the customer a unique control key, also referred to as an authentication token that is physically placed in escrow with an independent third party escrow entity or agent. An authorization token is just one example of authorization information. Another example of authorization information is biometric data. Any suitable type of authorization information may be used. The client or customer account for each customer or user is provisioned or programmed to enable only write financial information once and thereafter the customer can only read that financial information in the cloud-based processing and storage platform. The escrow agent is instructed by secure data center to release a control key only upon certification by the customer.

An example certification for a broker-dealer customer might be that a Rule 17a-4 Books and Records relationship with the broker-dealer customer has ceased. At that point, the financial information may be deleted from the cloud-based processing and storage platform and preferably stored on some other storage medium that may or may not be WORM-compliant. But prior to cessation of a Rule 17a-4 Books and Records relationship with a customer, any request for that customer's data by the customer, the SEC, or other applicable regulator in The System's capacity as a Designated Third Party (D3P) will be fulfilled via delivery of a copy of the financial information stored in the cloud-based processing and storage platform in a requested format.

The cloud-based processing and storage platform also employs additional safeguards to protect data and prevent outside access. Example safeguards include, but are not limited to the use of firewalls, access control lists, virtual private networking, intrusion detection systems and the use of encrypted communication protocols. The cloud-based processing and storage platform may also maintain an audit and data integrity verification system that scans through record files to ensure they have not been modified or deleted in order to detect whether any data residing on the cloud storage platform is somehow compromised, and if so, the cloud-based processing and storage platform is configured to restore that data from a redundant backup.

An advantage of the authentication token is that financial information stored in the cloud-based processing and storage platform may only be deleted, modified or destroyed prior to expiration by using a unique hardware control key placed in escrow with a third-party entity that is unrelated and independent of the cloud-based processing and storage platform, the secure data center, and the customers or users. The control key facilitates transition of data stored in the cloud-based processing and storage platform to an alternate medium in the event of an early termination of the relationship with the secure data center.

For an example application to regulatory records retention (R3) for financial information, the financial information is retained in the cloud-based processing and storage platform until: (a) the applicable designated retention period (life of data) lapses—at which point the data can be deleted from the cloud-based processing and storage platform by a purge application that is only capable of determining a file's expiration date or (b) in the event of cessation of the Rule 17a-4 Books and Records relationship, at which time (i) the control key is released from escrow and used to remove the data from the cloud-based processing and storage platform and (ii) the data can be transferred to a WORM-compliant device.

In addition to these safeguards, the financial information is encrypted. Encrypting both the financial information (stored as a file) and metadata related to that financial information (file) making it very difficult to determine the contents of a file or a file's unique identifying properties without having access to the associated encryption keys needed for decryption. Those encryption keys are preferably stored in a secure hardware security module (HSM) device. Only the secure data center has access and connectivity to the HSM device to effectively render stored the encrypted data inviolate.

The various permission, software, and hardware control elements keep financial data inviolate for the required retention period and safeguard the financial data against malicious and accidental destruction or modification or unauthorized access.

Another feature is automatic verification of the quality and accuracy of the storage media recording process. SEC Rule 17a-4(f)(2)(ii)(B) requires that the media recording process is accurate to a very high degree and that the recorded information is not altered from its original content. The technology achieves compliance through the use of extensive, ongoing testing and audit of the recording process. First, the secure data center automatically logs the successful reception of each record file including financial information as well as a successful write of each file to the cloud-based processing and storage platform. Second, for all financial information records received, the secure data center creates and stores a unique content identifier (e.g., a unique hash) of the record file (a) before encrypting and compressing the file and (b) after encryption and compression but before transferring it to the cloud-based processing and storage platform. These hashes (hash digests) are also stored in the cloud-based processing and storage platform and linked to their respective record files. Third, after encryption, a hash is computed of the encrypted data and then compared with the respective financial information record stored in the cloud-based processing and storage platform cloud to ensure it was accurately written. In addition, the cloud-based processing and storage platform preferably also performs a separate, periodic hashing and verification process on all files hosted on the cloud-based processing and storage platform to ensure the accuracy of duplicate copies of files resident on the cloud-based processing and storage platform.

Computational data verification is preferably performed at multiple stages including within the secure data center and the cloud-based processing and storage platform. In addition to the multi-step auditing of each step in the data storage process described above, full indexing of each file that resides on the system including the associated meta information is performed. Meta information or metadata is data that provides information about other data or data about data. Examples include information such as the creation date, author, type and size of a file or discrete piece of data.

Another feature is serialization of the original financial information record, and, if applicable, duplicate financial information records, along with the time-date for the required period of retention the stored financial information. Section III(B) of the 2001 Release of SEC Rule 17a-4(f)(2)(ii)(C) requires assurance of "both the accuracy and accessibility of the records by indicating the order in which records are stored, thereby making specific records easier to locate and authenticating the storage process." The Rule may be satisfied for electronic records by capturing index or metadata associated with each electronic record that 1) uniquely identifies the record, and 2) associates a date of recording with each record.

The cloud-based processing and storage platform use a data storage methodology where each customer's files are segmented and accessible via a unique address within the cloud-based processing and storage platform. Individual record files are assigned unique names according to a predetermined convention and scanned for various unique metadata properties example of which include date received, file type, and a unique hash digest identifying number that are stored in an index and linked to a unique name and specific location on the cloud-based processing and storage platform. The unique hash digest of each file is stored alongside or linked to the actual financial information file in the cloud-based processing and storage platform for verification purposes. A full audit log of every file's intake to the system and successful write to the cloud-based processing and storage platform is also maintained.

As an example, when a record file is received by the cloud-based processing and storage platform intake functionality, it is analyzed for metadata related to each file such as file creation date, date the file is received, file type, record type, and unique identifying hash identifier. This information determines how long the record must be retained on the cloud-based processing and storage platform as well as the file's expiration date (date when the last contained record is no longer required to be retained). The metadata, expiration date and each file's unique hash identifier are then recorded to a file linked to and stored with each record file on the cloud-based processing and storage platform. The captured meta-information and expiration date are also accessible by the master index system and audit log. If the required retention period for a file cannot be determined automatically and is not provided by the customer, the file may be default-marked for indefinite retention. Users may also designate each individual record file for indefinite holding subsequent to entry into the cloud-based processing and storage platform.

SEC Rule 17a-4(f)(3)(iii) requires that a duplicate copy of the record be stored for the predetermined time. This means that an alternate storage source is provided for accessing a record should the primary source be compromised. The cloud-based processing and storage platform automatically duplicates all data housed on the platform across multiple individual servers located in datacenters resident in disparate geographic areas. The secure data center offers extensive durability and redundancy features such as automatic backup to multiple datacenters and a design tolerant of concurrent loss of data in two secure data centers. To ensure durability, the cloud-based processing and storage platform synchronously writes data to multiple distinct, geographically separate physical mediums before reporting that an operation or transfer was successful. Once stored, the cloud-based processing and storage platform maintains the durability and integrity of files by quickly and automatically detecting and repairing storage issues using redundantly stored copies.

The information maintained on both original and duplicate storage media is organized and indexed as described earlier so that the indexes are available for examination and are duplicated and stored separately from originals for the time required for the index records. As financial information records or files are provided to the secure data center by a customer or user, the records or files are analyzed by the secure data center to identify pertinent metadata that may be used to identify, search for and retrieve the files such as: file name, record type, time/date received, time/date of file creation, expiration date (retention period), file type, unique "hash digest" value of the unencrypted original file, and unique "hash digest" value of encrypted, compressed file. The metadata is recorded to an index database which is resident in multiple locations for redundancy. All collected data pertaining to each file is preserved for the life of that file's retention on the cloud-based processing and storage platform. All actions pertaining to the index such as the recording of new information, occasions when the index is accessed by a user, or the removal of an indexed record, are recorded in an audit log. In the case of multiple, non-trade records residing in a single, structured dataset, the secure data center queries customers/users to provide, in addition to the dataset itself, data on structure, format and application code needed to parse and query each individual dataset. The customer also provides appropriate index and relational information to allow the records contained on a given dataset to be identified. The index system in the cloud-based processing and storage platform is integrated with the secure data center search and retrieval utility to provide authorized users with a graphical user interface to search through and download archived index data on demand. The index system is also integrated with the cloud-based processing and storage platform audit log to record when each index is accessed, downloaded, or updated. When records reach their expiration period on the cloud-based processing and storage platform, the index is also updated to reflect the removal of a record from the cloud-based processing and storage platform and registers the file's ultimate destination. As emphasized, the index is stored in the cloud-based processing and storage platform to assure that duplicate copies are maintained, preserved and unable to be modified once recorded.

As described above, another feature of the technology is the audit system that provides for accountability for input of and changes made to every original and duplicate record to comply with requirements of SEC rule 17a-4(F)(3)(v) to have the results of the audit system available at all times, and to preserve audit results for the time required for the audited records. The secure data center runs and maintains a robust audit system to track all activity related to data storage and retrieval. Activity is verified and logged to a redundant electronic database at the following stages:

1) when a file is received and successfully written to local storage within the secure data center.
2) when meta-information is written to an index, and when that indexed information is updated.
3) when a file is successfully encrypted and compressed.
4) when a file is stored, a write completion notification is recorded.
5) when it is successfully verified that a file's original hash digest matches the new hash digest run for the purposes of ensuring write accuracy.
6) when files are requested or retrieved: a log is kept of all searches, requests and successful retrieval of records. The system also records which specific users performed said activities.
7) removal and copy of deletion: at the conclusion of the required retention period, the audit system will track and log what action is taken with each record file including if it is copied to another storage medium or completely deleted.

Audit logs are stored locally in a clustered, geographically-replicated database. All audit logs related to an archived data record are retained for the life of that data record. Audit information can be searched and retrieved on demand by users using a GUI supported by the secure data center. The cloud-based processing and storage platform provides comprehensive logging of all activity related to storing, searching for, and retrieving client records. The audit system is integrated with: the file intake system, the indexing system, the encryption system, cloud-based processing and storage platform applications, e.g., purge application, and the GUI mentioned above. The maintained audit logs are searchable, e.g., according to the criteria like date/time by function (file received, indexed, etc.), file name, etc. Once a search is made users can download the pertinent information audit information on demand.

The technology allows ready download of files and records preserved on the cloud-based processing and storage platform, per SEC rule 17a-4(f)(2)(ii)(D), by hosting a comprehensive index of all files and the associated meta-properties within the secure data center. This provides full redundancy and guaranteed on-demand accessibility. Indexes and indexed data may be accessed using the web-based GUI at the secure data center for viewing or download. Searched files or result sets are returned in their native format from which users can convert and transfer the files as needed within their own facilities.

SEC rule 17a-4(f)(3)(vii) requires for every member, broker, or dealer exclusively using electronic storage media for some or all of its record preservation under this section, at least one third party ("the undersigned"), who has access to and the ability to download information from the member's, broker's, or dealer's electronic storage media to any acceptable medium under this section, shall file with the designated examining authority for the member, broker, or dealer undertakings with respect to such records. The secure data center operates in conjunction with the cloud-based processing and storage platform the systems that physically input and store financial information records for users. The secure data center, which holds the master encryption keys and has access to the cloud storage client or customer account (read/write access), has independent purview to access and decrypt any user's financial data. The secure data center also retains control over all indexes and audit logs associated with each record. If needed, the secure data center can work with regulators to download customer records in the required format in the case of a customer's inability or unwillingness to comply. The cloud-based processing and storage platform maintains extensive permission and security policies designed to provide granular control over access to stored data. The secure data center operates the encryption key management system and, in conjunction with the cloud platform provider and the escrowed third party control key or authentication token, can access stored data in the cloud-based processing and storage platform in the appropriate circumstances. As such, the secure data center is able to guarantee access to and decryption of data stored in the cloud-based processing and storage platform for use by examining authorities if needed.

One non-limiting example of the cloud-based processing and storage platform uses a distributed storage service provided by a web services provider, which is a storage service accessed over the Internet. It is designed to make web-scale computing easier for developers and it provides a simple web services interface that can be used to store and retrieve any amount of data, at any time, from anywhere on the web. It gives any developer access to the same highly scalable, reliable, secure, fast, inexpensive infrastructure that the web services provider uses to run its own global network of web sites. The service aims to maximize benefits of scale and to pass those benefits on to developers. In a distributed storage service, one can write, read, and delete objects containing from 1 byte to 5 terabytes of data each. The number of objects one can store is unlimited. Each object is stored in a "bucket" and retrieved via a unique, developer-assigned key. A bucket can be stored in one of several Regions. One can choose a Region to optimize for latency, minimize costs, or address regulatory requirements. For example a U.S. Standard Region will automatically route requests to facilities in for instance Northern Virginia, or the Pacific Northwest, using network maps. Objects stored in a Region never leave the Region unless transferred out. For example, objects stored in the EU Region never leave the EU. Authentication mechanisms are provided to ensure that data is kept secure from unauthorized access. Objects can be made private or public, and rights can be granted to specific users. Options for secure data upload/download and encryption of data at rest are provided for additional data protection.

Data stored in the distributed storage service is secure because only bucket and object owners have access to the distributed storage service resources they create. The distributed storage service supports multiple access control mechanisms as well as encryption for both secure transit and secure storage on disk. With these data protection features, one can protect data from both logical and physical failures, guarding against data loss from unintended user actions, application errors, and infrastructure failures. The various data security and reliability features offered by the distributed storage service are described below.

The distributed storage service supports several mechanisms that give flexibility to control what entity can access data, as well as how, when, and where it can be accessed. The distributed storage service provides four different access control mechanisms: Identity and Access Management ("IAM") policies, Access Control Lists ("ACLs"), bucket policies, and query string authentication. IAM enables organizations with multiple employees to create and manage multiple users under a single AWS account. With IAM policies, one can grant IAM users fine-grained control to the distributed storage service bucket or objects. One can use ACLs to selectively add (grant) certain permissions on individual objects. The distributed storage service Bucket Policies can be used to add or deny permissions across some or all of the objects within a single bucket. With Query string authentication, one has the ability to share distributed storage service objects through URLs that are valid for a predefined expiration time.

A compute service is a web service from the web services provider that provides on-demand, resizable compute capacity in the cloud. It is designed to make web-scale computing easier for developers and enables instant increase or decrease capacity. It allows automatically scalability up and down depending on needs.

A type of computer service that implements a MapReduce programming model enables businesses, researchers, data analysts, and developers to easily and cost-effectively process vast amounts of data. It utilizes a hosted Hadoop (i.e., a Hadoop is a framework that allows for the distributed processing of large data sets across clusters of computers using simple programming models) framework running on the web-scale infrastructure of a complete service of the distributed storage service.

FIG. 1 is a diagram of a non-limiting example embodiment of a secure and persistent financial data storage and retrieval system. A secure data center 14 can communicate via one or more data communication networks with a cloud-based processing and storage platform 25. For example, the secure data center 14 may be operated by a financial services company such as NASDAQ OMX and the cloud-based processing and storage platform 25 may be operated by the web services provider to provide distributed cloud services such as those described above. Some of the specific implementation description below is based on the non-limiting web services provider distributed storage service example.

Users communicate with the secure data center 14 and with the cloud-based processing and storage platform 25 via the secure data center 14 and provide financial information to the secure data center 14 using a client communications and/or computing device 12. Users may also query the cloud-based processing and storage platform 25 via a user communications device 13 via a web-base GUI 19 provided by the secure data center 14.

The secure data center 14 is preferably divided into a customer tier and a processing tier (although other configurations may be used). Customer/users upload financial information to one or more inbound servers 18, e.g., file transfer protocol ("FTP") server(s), which write the financial information into a customer's inbox on the storage area network ("SAN") via the network file system ("NFS"). A user or customer "inbox" is located on a SAN device accessible to both the inbound server 18 and the in the staging processor (s) 20 in the processing tier and is not accessible from the web graphical user interface 19. The inbound servers mount a segment of the SAN device for customer inboxes which is the only access allowed from the customer tier into the processing tier. User upload permissions, e.g., in the FTP service, are preferably locked down. The web GUI 19 is configured to deny administrative logins. This customer tier has read-only access to data in the cloud-based processing and storage platform 25 to allow customers/users to download report output directly to their browser. The GUI request comes in through the customer tier and then accesses the database tier before starting a workflow job 21 that initializes the search in the cloud-based processing and storage platform 25.

The processors in the processing tier are able to access various services provided by the cloud-based processing and storage platform 25 and have the appropriate credentials to control financial information storage and retrieval jobs, upload financial data to elastic, on-demand storage 27 in the cloud-based processing and storage platform 25, etc. All cloud-based resource coordination is performed in this tier, as is upload processing, encryption key creation, report output delivery to customers, etc. Customers/users do not interact directly with these systems, and reports are only delivered to customer systems—customers do pull output directly from this tier. One or more workflow processor(s) 21 perform inbox monitoring by polling of the staging processors 20 which return appropriate files, data upload, Hadoop job orchestration (see the start/stop jobs in FIG. 1 sent to the cloud platform 25), and report output delivery processes to one or more remote delivery se The secure data center also includes a key appliance and database tier 17. Access is granted into this tier only from specific IP addresses and only to specific ports as needed. Credentials granted for access to the database(s) do not have schema modification privileges (drop table, etc.) and are limited to what is necessary. The database 22 stores users, user information, file maps, workflow status information, and metadata. The GUI 19 must access to the database 22 for user authentication, reading job status, creating new reports, etc. Key management processor(s) 23 manage user encryption keys used to encrypt financial information so that the financial information is encrypted while being communicated and stored in the secure data center 14 and in the cloud-based processing and storage platform 25. The cloud-based processing and storage platform 25 includes a distributed processing system 26, which in the distributed storage service example is a managed Hadoop cluster, that in response to requested storage and retrieval job requests from the workflow processor(s) retrieves the necessary encryption keys from the key management processors 23 via the work flow processors 21. The keys may be retrieved as one example using a virtual private network ("VPN") connection. Preferably, communication connectivity from the cloud-based processing and storage platform 25 to the secure data center 14 is limited to the Processing Tier via specific IP addresses and ports. Such limitations may be further enforced within the cloud-based processing and storage platform 25 by a Virtual Private Cloud ("VPC") routing table, Network ACLs, and Security Groups. VPC provisions a private, isolated section of the cloud-based processing and storage platform 25 where users can launch distributed storage service resources in a user-defined virtual network.

The cloud-based processing and storage platform 25 also includes a secure elastic storage system 27 which is well-suited for regulatory records retention (R3). The cloud-based processing and storage platform's distributed processing system 26 communicates with the elastic storage system 27 to store and retrieve financial information using for example virtual machines running in the compute service system to host Hadoop job processing clusters 26. These machine instances run an operating system (OS) image with Hadoop software pre-installed. As part of the initialization of these machine instances, various "bootstrap" steps can modify the system as desired. A system log (syslog) on these systems may be reconfigured to send logging traffic back across a VPN tunnel to secure data center-hosted internal security server(s) for scanning. OS-level monitoring software may also be installed.

Figure 2:
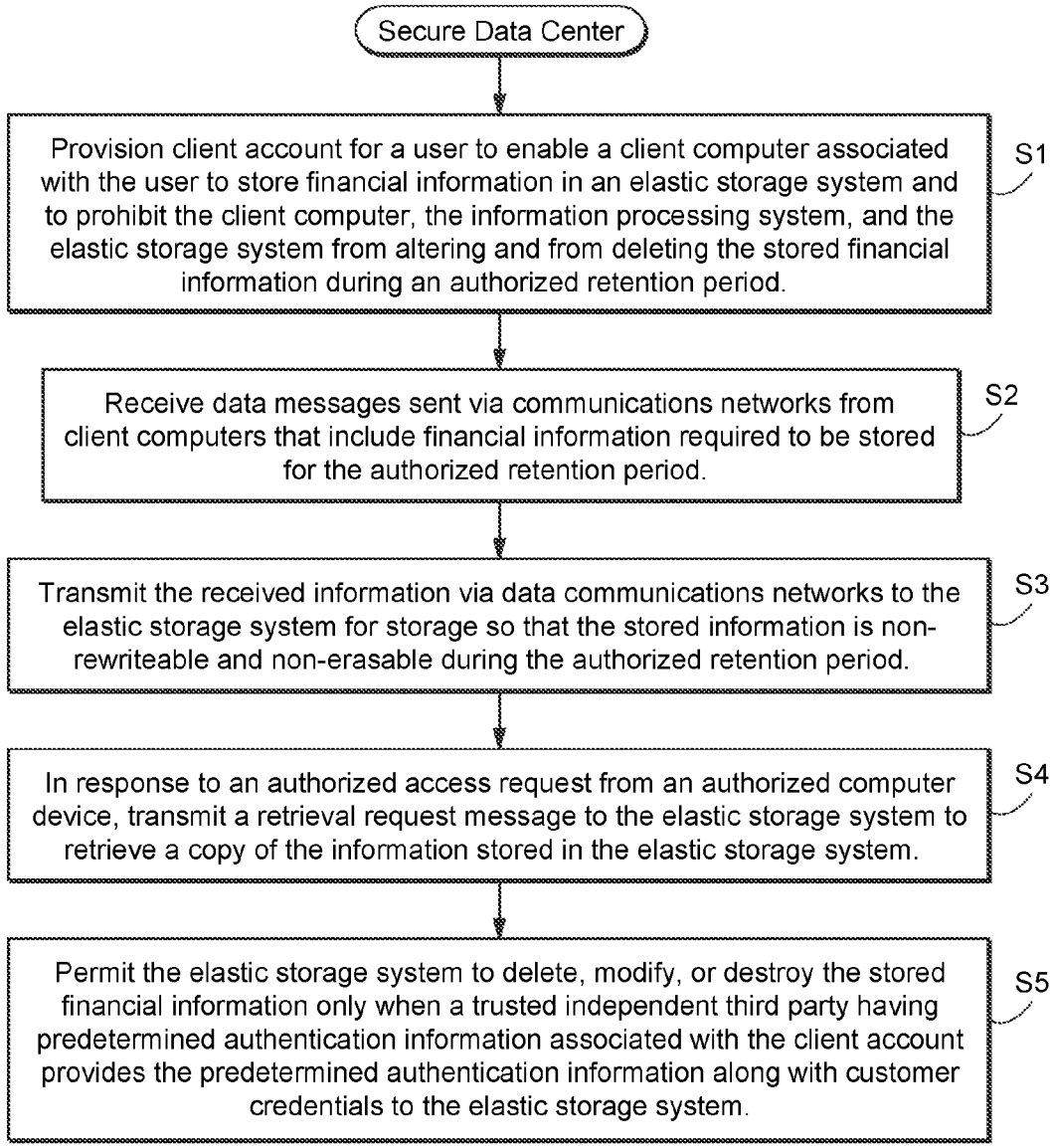
FIG. 2 is a flow chart illustrating non-limiting example procedures for securely and persistently storing and retrieving financial data.

FIG. 2 is a flow chart illustrating non-limiting example procedures for securely and persistently storing and retrieving financial data from the perspective of the secure data center 14. In step S1, the secure data center 14 provisions a client account for a user to enable a client computer 12 associated with the user to store financial information in an elastic storage system 27 and to prohibit the client computer 12 and other user communication device 13, the secure data center 14, and the elastic storage system 27 from altering and from deleting the stored financial information during an authorized retention period. In step S2, the secure data center 14 receives data messages from the client computer 12 that include financial information to be stored for the authorized retention period. That information is transmitted by the secure data center 14 via one or more data communications networks to the elastic storage system 27 for storage so that the stored information is non-rewriteable and non-erasable during the authorized retention period (step S3). In response to an authorized access request from an authorized computer device 13, the secure data center 14 transmits a retrieval request message to the elastic storage system 27 to retrieve a copy of the financial information stored therein (step S4). The secure data center 14 receives the retrieved copy and provides it to the user via the web GUI 19. The elastic storage system 27 permits deletion, modification, or destruction of the stored financial information only when a trusted independent third party 28 having a predetermined authentication token associated with the client account provides the predetermined authentication token to the elastic storage system 27 via one or more administrators associated with the secure data center (step S5). Thus, when it is determined that data is to be deleted, an operational procedure involving one or more administrators associated with the secure data center includes the one or more administrators contacting the third party escrow agent and requesting the predetermined authentication token (e.g., an MFA token) related to the deletion action. Procedures and processes are followed by the administrator to ensure proper authorizations exist before the one or more administrators initiate the delete function on the target data.

When appropriate, a secure data center administrator contacts the third party 28 to request access to the secure predetermined authentication token for a specific client. A "caller" authentication then occurs where the secure data center administrator provides the third party 28 with an appropriate password. Once confirmed, the third party 28 provides the predetermined authentication token to the secure data center administrator who uses it to access the account in question and issue "delete" instructions for specific data.

User credentials for storing and retrieving financial information from the cloud-based processing and storage platform 25 are stored in the database 22. In one example embodiment, user credentials are stored as SHA-256 hashes with 1024 iterations and a random 8-byte salt value. Passwords are required to meet password policies of the exchange industry standard.

The clustered workflow processors 21 perform tasks asynchronously and coordinate steps in the various storage, retrieval, and delete functions and produces a detailed audit trail of all steps performed including errors. Each step in a process can be restarted in the event of a failure during processing. Administrative users can use the web GUI 13, 19 to view detailed workflow status information including the audit trail for individual processes, which specific systems performed each step in the process and other information. Administrative users can also manually restart workflow steps as needed and perform other administrative functions with respect to workflows including moving a work item back to a previous step to re-perform processing at any point in the workflow. This workflow system is hosted in the database 22 (i.e., the workflows system state is persisted in the database) to ensure availability and continuity of state between systems running in multiple secure data centers.

Although only one secure data center 14 is shown in FIG. 1, workflow steps which coordinate activities in the cloud platform 25 such as running reports, downloading and delivering report results, etc. can be executed from any one of multiple secure data center regardless of which data center the workflow was initiated from. If one secure data center is offline, those workflow steps can be performed by another secure data center, assuming that data center has connectivity to the cloud platform 25.

The distributed storage service is a regional service, and as such each data object is stored in multiple datacenters in multiple Availability Zones (AZs) and is designed to sustain concurrent loss of data in two facilities. Objects are periodically checked using a hashing function, and in the event of a problem data is corrected using redundant object copies. Once an upload operation is completed, the data has been stored in multiple datacenters by the cloud platform 25. If an upload fails as a result of a cloud facility becoming unavailable or any other error, that upload is automatically restarted by its workflow processor 21. The integrity of data uploaded is checked once the upload is complete. API response by the cloud platform 25 for uploading data includes in the distributed storage service example an MD5 hash of the object content, which is used by workflow processors 21 to determine if there was any data corruption during upload.

Each Hadoop cluster 25 runs in a single web services provider VPC subnet, which is pinned to a single Availability Zone (AZ). When a workflow processor 21 initiates a start job, the Hadoop cluster 25 picks a random AZ and subnet for that job from a pre-configured list. If that job fails because the AZ it is running in goes offline, the workflow processor 21 can restart the job in a different AZ. Workflow processor-controlled Hadoop jobs are idempotent, so restarting the job in a new AZ does not result in any corrupted input or output data. Financial information stored in a distributed storage service cloud is stored redundantly across multiple AZs, so the data required to process a report would still be accessible from the "new" AZ and the new Hadoop job. The web services provider's hosted Hadoop system type of computer service that implements a MapReduce programming model automatically detects problems with individual cluster nodes and replaces nodes in the running cluster as needed by provisioning replacement machine instances and adding them to the Hadoop cluster. Because they operate on data present in their local datacenter, upload processing workflows are performed in the same datacenter to which the client uploaded their data. Similarly, report results download workflows run in a given secure data center and all steps must be performed in the same data center. Result download workflows may be re-run in another secure data center, but would have to start from the beginning of the download process. In the event of a disaster, upload workflows could either be re-run once the affected data center is back online or could be started anew as a result of the client uploading data to another data center—in this case, a new workflow would be created and would execute on the newly uploaded data. This may be abated using a shared, redundant SAN system which spans secure data centers to host the upload "inbox" and download processing folders.

A fine-grained user activity audit trail is generated and stored in the relational database 22. This audit trail captures successful and failed logins, password changes, profile updates, create, view, edit and delete of users and reports and can be extended to audit any activity in the system as desired. This user activity audit trail is preferably separate from a workflow processor's audit trail and is stored in a separate database instance. In one example implementation, the credentials used to connect to database 22 are given only INSERT and SELECT privileges on the audit trail tables. Both the workflow processing audit trail and the user activity audit trail preferably comply with desired or required log retention policies.

All data records stored in the elastic storage 27 in the cloud platform 25 are encrypted, for example, using the standard AES algorithm and 256-bit keys. All keys and AES initialization vectors are created using Java's SecureRandom RNG. This implementation complies with FIPS 140-2, Security Requirements for Cryptographic Modules, section 4.9.1 and RFC 1750: Randomness Recommendations for Security. Keys are stored in the key management processors 23. These devices are FIPS 140-2 Level 3 compliant hardened key storage devices and operate in a "hot-hot" fully redundant clustered configuration. Keys are stored redundantly across all the devices in the key management processor cluster 23. As one example, two Hardware Security Module (HSM) devices may be included in each secure data center in use and a SafeNet HSM backup storage device may also be used if desired.

Figure 3:
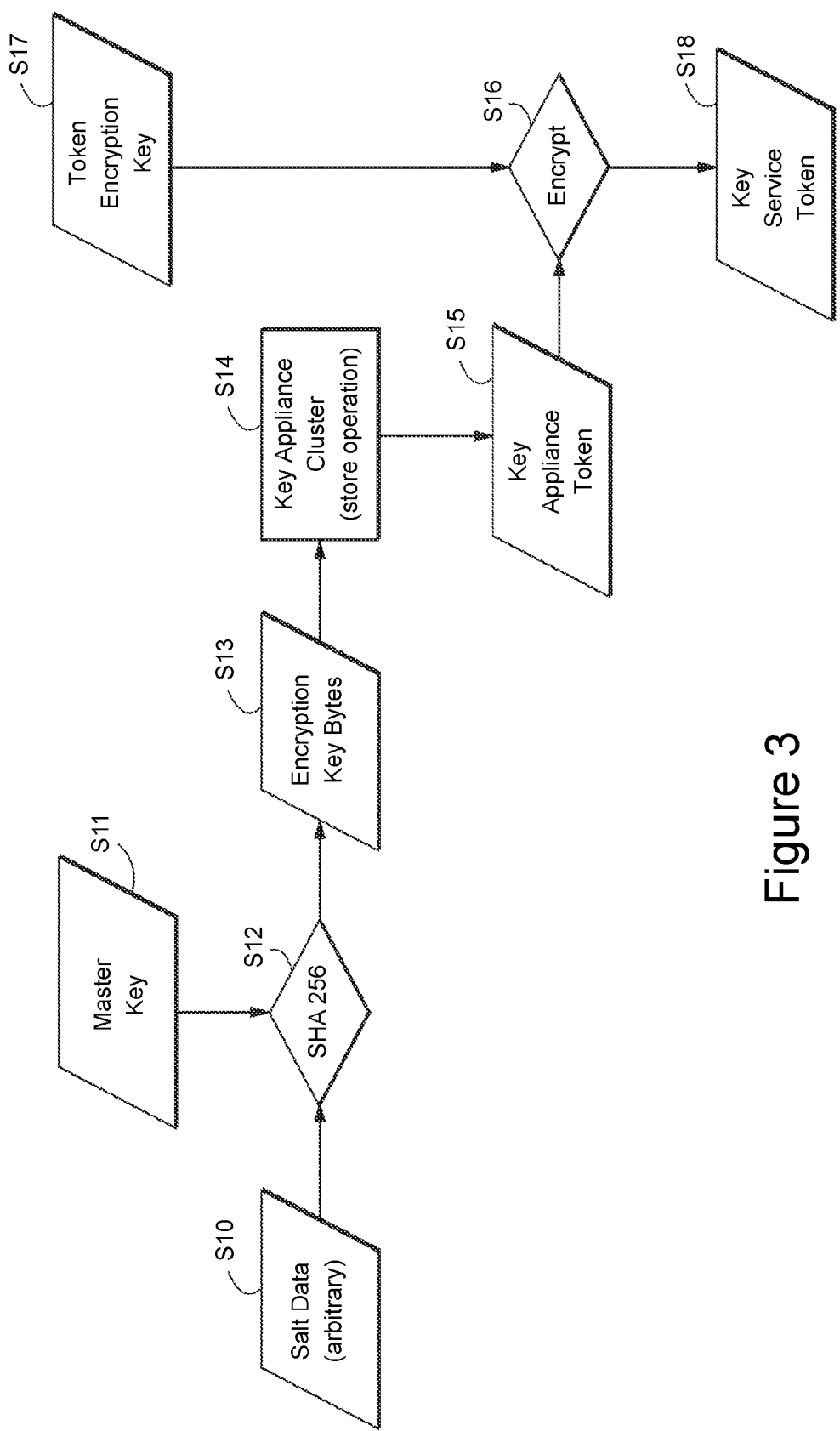
FIG. 3 is a flow chart illustrating non-limiting example procedures for encryption key generation and storage.

Encryption keys are generated based on arbitrary input data combined with a "master key" which is passed through the SHA-256 hash function to produce a 256 bit key. FIG. 3 is a flow chart illustrating non-limiting example procedures for encryption key generation and storage in which the master key (S11) is stored in the key management processor cluster 23 and can be rotated as needed (S12) using a secure hash algorithm (SHA). Multiple requests to generate a key given the same salt value (S10) will return the same encryption key bytes (S13). It may be desired to rotate encryption keys daily and by client so an example salt value may be the name of the client and the date associated with a particular piece of data. Multiple servers can then independently generate the same key for the same date. The master key may be rotated but is not required. Once an encryption key has been generated, it is stored in the key management processor cluster 23 (S14). The key management processor cluster 23 returns a key appliance token (S) representing the encryption key, which must be sent to the key management processor cluster 23 during key retrieval. A token encryption key (S17) (also stored in the key management processor cluster 23) is used to encrypt (S16) the key appliance token returned from the key management processor cluster 23—this token encryption key must not change because it is used to decode key service tokens (S18) into key appliance tokens. Even if this token encryption key is compromised, the actual encryption keys are not at risk because a compromised token encryption key only allows an attacker to decode a key token from the cloud platform 25 into a key token for the key management processor cluster 23. Even in this case, the attacker would still need direct access to the key management processor cluster 23 and credentials to retrieve actual encryption keys. The encrypted key appliance token is the value returned by the key management processor cluster 23 and is then stored in the cloud platform 25.

Figure 4:
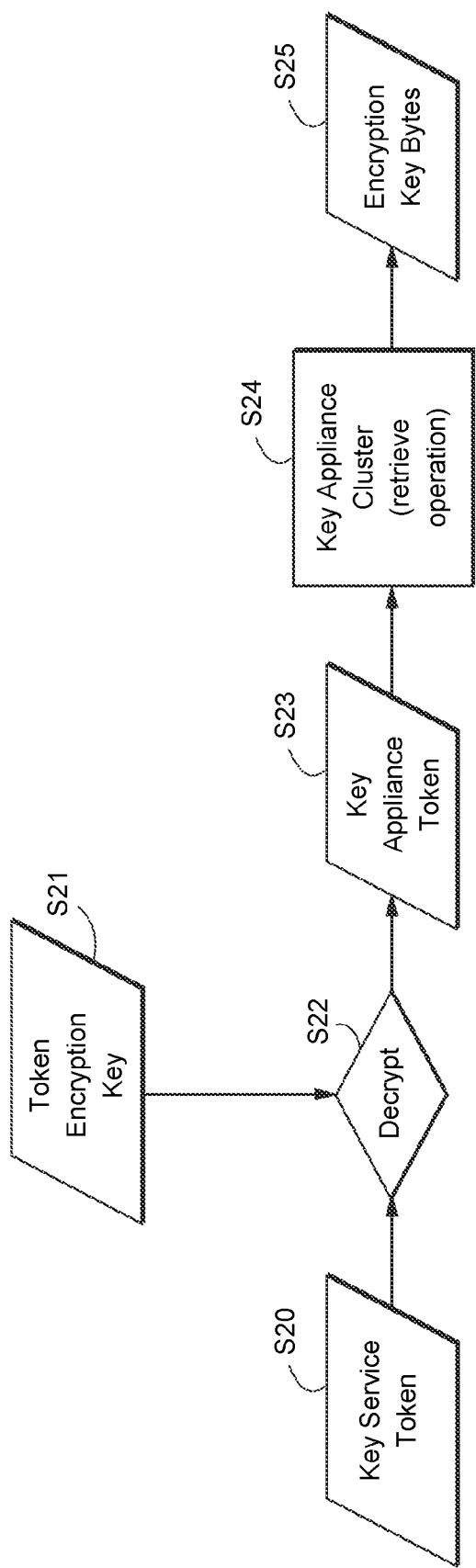
FIG. 4 is a flow chart illustrating non-limiting example procedures for encryption key retrieval.

FIG. 4 is a flow chart illustrating non-limiting example procedures for encryption key retrieval given a key service token (S20). The token encryption key (S20) is used to decrypt (S22) the key service token and produce the key appliance token (S23). The key appliance token is sent to the key management processor cluster 23 (S24) which returns the original encryption key (S25) for the encryption key bytes. The key management processor cluster 23 is only accessible from the secure data center and is not accessible directly from the cloud platform 25.

A detailed example encryption embodiment is now described. Customer/user financial information files to be uploaded are placed in an "inbox" that may be a directory accessible via SCP, FTP, or some other mechanism. This inbox is preferably unique per customer/user (to avoid commingling client data). The uploaded data is already encrypted by the client device, e.g., using PGP encryption for which PGP keys are exchanged between the client device and the inbound servers 18 in the secure data center 14. The R3 elastic storage system includes one or more servers (the staging processor(s) 20) that monitor directories or run separate R3 server instances per customer. After detected via monitoring, the PGP-encrypted file is moved to the staging processors 20 for decryption and further processing. At this point, the file is no longer accessible through the customer's inbox. An encryption key is created and stored in the key management processor cluster 23. This encryption is different from and instead of the PGP encryption used between users and the secure data center. The key management processor cluster 23 generates a token to represent the created encryption key. The same key may be used to encrypt multiple files, depending on policy. An example policy might be to use a new key per day and per client. Each time a file is encrypted, a random initialization vector is created—the same encryption key is used for all files on the same day, however, each file may have a unique initialization vector. Then, the file is compressed e.g., using GZIP, and the compressed file is encrypted using AES-256. A manifest file is created to hold metadata about the encrypted, compressed file. This manifest file contains the SHA-256 hash of the original unencrypted, uncompressed file, the key token representing the key used to encrypt the file and the initialization vector for use with the key. An uncompressed ZIP archive is created with the manifest file as one zip entry and the compressed, encrypted payload file as another zip entry. The zip file is uploaded to a storage location in the R3 elastic storage system, e.g., a bucket in the distributed storage service platform. Included in the upload response is an MD5 checksum calculated on copy of the stored data. This checksum is compared against an MD5 checksum of the local file stored in the elastic storage 27, and if the checksums do not match, the upload process is marked failed in the workflow processor 21, and an error is reported to R3 system operators. Since the file that failed MD5 comparison is already in WORM storage, resolving this failure would require manual intervention.

The workflow server 21 in one example embodiment uses two sets of API credentials to make calls to the R3 elastic storage system 27. One set is able to write data into a storage location in the R3 elastic storage system, e.g., a distributed storage service bucket, and another is only able to list and download objects. In addition, that storage location in the R3 elastic storage system, e.g., the bucket, is configured so that objects cannot be updated and that deletes require the use of an MFA token. The MFA token is held in escrow by a third party security entity 28 so that it is not possible to accidentally delete or modify any data in that bucket. Access to the bucket is also restricted by source IP address and enforcing a communication security protocol such as secure sockets layer (SSL). In one embodiment, all connections use SSL for transport-level encryption.

Users are able to login to the web GUI 19 via a user device 13 and browse the financial information they stored in the system and download their financial information items as desired. When downloading data, it is first retrieved from the distributed storage service and provided to the staging processors 20 in the secure data center 14 where it is then decrypted and sent back to the customer, e.g., PGP-encrypted using a PGP key specified by the customer.

Figure 5:
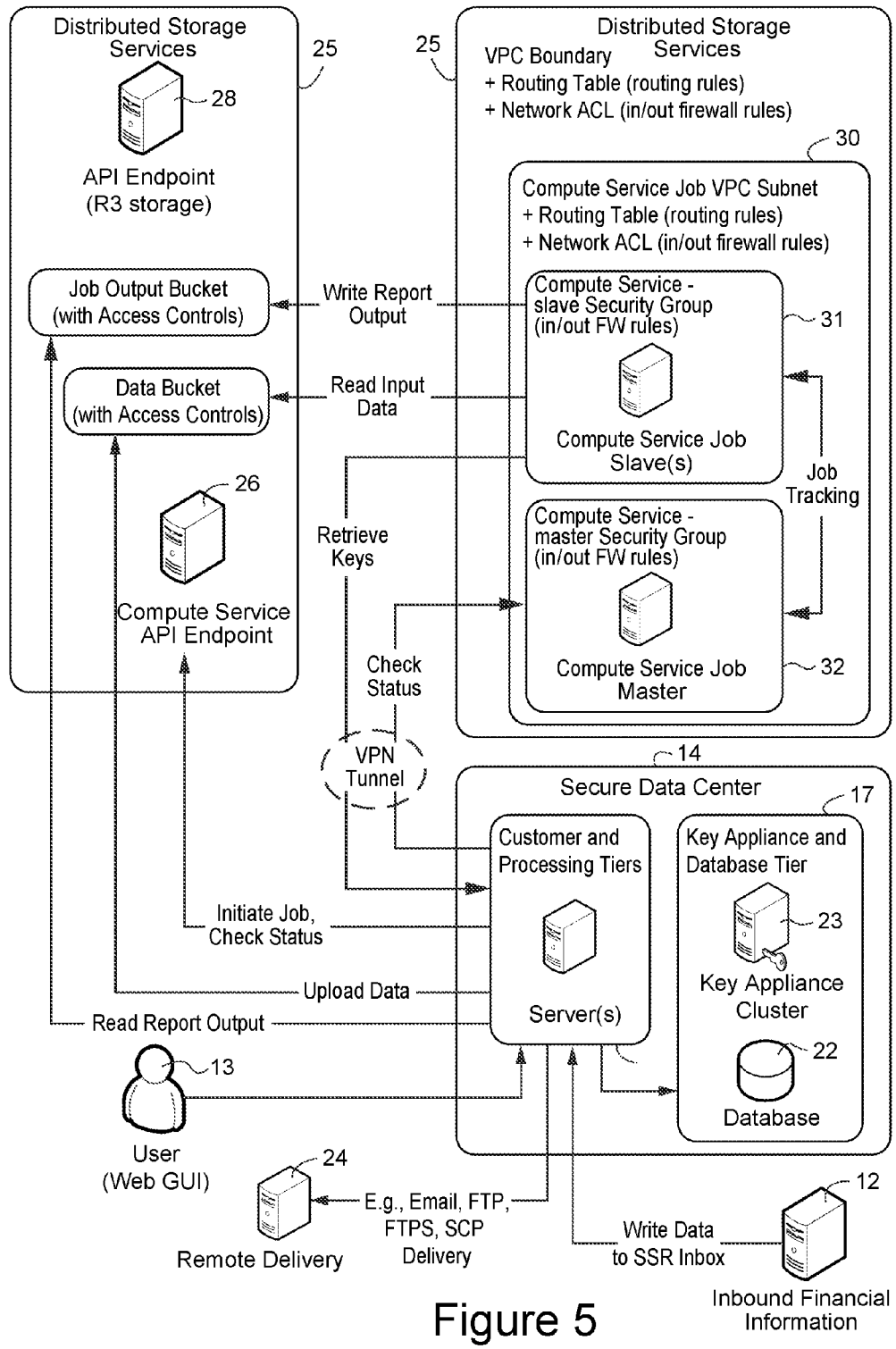
FIG. 5 shows another non-limiting example embodiment of a secure and persistent financial data storage and retrieval system.

FIG. 5 shows another non-limiting, example embodiment of a secure and persistent financial data storage and retrieval system using distributed storage services as an example cloud services platform 25. Terminology specific to the a web services provider's distributed storage service is used below in describing this example embodiment and is not intended to be limiting or required for other embodiments and implementations.

Security Group:

A configurable firewall assigned at the compute service instance level which allows stateful traffic filtering on both inbound and outbound traffic from a given compute service instance. The type of computer service that implements a MapReduce programming model master and slave nodes are associated with separate security groups which can have different filtering configurations. By default (and in our configuration) inbound traffic to slave nodes is restricted only to traffic originating from the master node. The slave nodes are able to communicate out to the distributed storage service API endpoint to retrieve input data and write results, and they are able to communicate with work flow processors 21 in the secure data center 14 to retrieve encryption keys. The work flow processors 21 are able to communicate with the distributed processing system 26 master node via Secure Shell (SSH) cryptographic network protocol only (an SSH key is associated with the type of computer service that implements a MapReduce programming model job when it is created).

Network ACL:

A stateless inbound/outbound traffic filter which is configured at the subnet level and at the overall VPC level. In addition to Security Group configurations for the type of computer service that implements a MapReduce programming model clusters, the VPC subnets which R3 provisions job clusters into are configured with a Network ACL which reinforces the security group controls, only allowing access out from the subnet to the distributed storage service endpoint and to the distributed processing system 26 master node. Traffic is allowed into the distributed processing system subnets only from the master node and then only to the SSH port on processing (slave) nodes.

Routing Table:

A set of routing rules which can be applied at the subnet level and at the VPC level. In our case, the overall VPC has a routing table which will support intra-subnet routing within the VPC, and the subnet used to run distributed processing system 26 instances is configured to only allow traffic to the distributed storage service endpoint and to the work flow processors 21 in the secure data center 14.

The Security Groups, Network ACLs, and Routing Tables are used to effectively isolate the compute service instances running Hadoop jobs, only allowing these nodes to communicate with each other, with the work flow processors and with the API endpoint for the distributed storage service.

The structured/trade data upload process is similar to an unstructured/document upload process except that where R3 stores documents without modification, trade data is broken up into multiple smaller files to make it more amenable to parallel processing using Hadoop (since individual trade messages are parsed and searched, instead of indexing/searching a single entire document). Once the work flow processor 21 has detected a file in the customer's inbox, example processing steps include:

1. The file is moved to a local staging location for further processing. At this point the file is no longer accessible through the customer's inbox.
2. An encryption key is created and stored in the key management processor 23. Key generation/storage works identically as previously described for document processing.
3. The file is parsed and split into an arbitrary number of pieces. The algorithm for splitting the file depends on the format of the data—the goal being to end up with more, smaller files (e.g., 20-30 MB) rather than have a single Hadoop node have to process a large file with a disproportional percentage of messages compared to other nodes in the distributed processing system 26 (during a trade data search). Each message is normalized into a common format (e.g., JSON) for storage, with metadata about the original message's format included. This allows for greater flexibility in later dealings with the data.
4. As part of this split operation, a "hints" file may be built for the data in each segment. This file can be thought of as a secondary index for the data in the given segment. It contains known values for certain fields from the messages in the segment (specifically which fields are used is dependent on the original format of the data). Examples of hinted fields are market participant identifiers (MPID), account, trader, symbol, etc. The hints file is used during search (if no values in the hints file match the search criteria, the entire file doesn't need to be parsed/processed) and is encrypted using the same encryption key and initialization vector as the data segment it is associated with.
5. Each file segment is compressed, e.g., using GZIP.
6. Each compressed segment file and hints file are encrypted, e.g., using AES-256.
7. A manifest file is created which contains the SHA-256 hash of the unencrypted, uncompressed segment file, the key token representing the key used to encrypt the segment and the AES initialization vector for use with the key.
8. An uncompressed ZIP archive is created for each segment with the manifest as one zip entry, the encrypted hints file as another entry and the compressed, encrypted payload file as the final zip entry.
9. The zip file is uploaded to a bucket in the distributed storage service.
10. Included in the upload response is an MD5 checksum calculated on the web services provider's copy of the stored data. This checksum is compared against an MD5 checksum of the local file. If the checksums do not match, the upload process is marked failed in the workflow engine and an error is reported.

11. Any temporary directories created during processing are deleted. Similar to document upload/search, different distributed storage service credentials are used to ensure any running process has the least amount of access permissions required to complete the required tasks.

Report Processing:

The distributed processing system 26 scans over files matching the specified search criteria. For documents/unstructured data, each document represents a single unit of work (the smallest amount of processing a single node in the distributed system can process). For trade data, the smaller files produced during ingest are the units of work processed by the distributed processing system 26. Users login to the web GUI to initiate reports, entering their specific report criteria into that interface (criteria such as the time range the report covers, what MPID, Account, etc., or for files, what keywords they are searching for). During a search, the following steps are performed:

1. An encryption key is created and stored in the key management processors 23. The appliance generates a token to represent the key. This key and a random initialization vector are used to encrypt intermediate data within the distributed processing system 26, and to encrypt the output data for the report.
2. A cluster of computers is dynamically provisioned inside a VPC to form the distributed processing system 26 that will search the encrypted files to produce search results.
3. While the distributed processing system 26 is running, the work flow processors 21 periodically checks status on the search by communicating with the distributed processing system 26. This is done to check for system failures, or if the search has completed, etc. Forensic information used to diagnose any system errors, as well as search progress (e.g. percent complete) is also periodically gathered. Search progress is also communicated to users via the web GUI.
4. Each node in the distributed processing system 26 is assigned a subset of the input data to process. These input files are the uncompressed ZIP archive files created by the upload process, and so contain a manifest file, encrypted hints information (for trade data files only) and the encrypted, compressed data payload. The manifest file is used to determine the encryption key token used to encrypt the hints and payload.
5. The node then communicates with the work flow processor 21 to retrieve the encryption key used for the current data segment from the key management processor 23. The hints file is decrypted first and used to determine if the payload needs to be read or can be skipped entirely. For instance, if the hints file indicates that the payload contains data for the "IBM" and "AMZN" symbols, but our search is querying for data related to the "GOOG" symbol, we know we can skip the file. This simple mechanism is very effective at reducing job execution times.
6. Assuming the payload cannot be skipped, it is stream-decrypted and processed in memory. The unencrypted data is never written out to disk on any machine in the distributed processing cluster. As records are decrypted, decompressed and processed, we write output records back to temporary storage in the distributed processing cluster 26 (e.g., to HDFS). These output records are encrypted with the AES key and initialization vector we provisioned to run this job in step #1.
7. Once all the search results have been generated across the cluster, the results are aggregated and written (still encrypted) to the distributed storage service.
8. The work flow processor 21 continues to check with the distributed processing system 26 to determine if the job is complete (or has failed for some reason). Once the job is complete, all the output data is available in the distributed storage service.
9. If the job was configured such that the output should be delivered immediately then servers in the work flow processor 21 download the output data from the distributed storage service, decrypt it and send it off to the client. If the client has configured a PGP key to use, the report output data is encrypted with their key before it is attached to an email message or transferred to their system as specified (FTP, FTP over SSL or SCP/SFTP).

User credentials may be stored in a relational database as SHA-256 hashes with 1024 iterations and a random 8-byte salt value. Report delivery credentials may be stored in the database. These are credentials which users have given for their systems so that report results may be delivered to them. These credentials may be encrypted with AES-256, a key appliance token is stored in a configuration file, and the key itself is stored in a HSM cluster which may be as an example a cluster of HSM appliances operating in a "hot-hot" fully redundant configuration across multiple, geographically diverse data centers. Keys may be encrypted with a master AES-256 key and stored in a database table. User PGP public keys may be stored with the user's profile in the database. Key length may be specified by the user by configuring their profile by pasting their public key into the web page. Keys are used to encrypt report output when it is attached to an email or delivered to the customer system via FTP, FTP over SSL or SCP/SFTP. Bouncy Castle PGP implementation for Java is one example.

All access to the web GUI and web service APIs requires SSL in this example. All communications with the distributed storage service APIs and distributed storage service upload/download are over SSL (and the buckets for data are configured to require SSL by policy). The connection from the webapp to the database is over SSL. Requests from Hadoop slave nodes to request keys from the R3 server (the work flow processor) are over SSL. SSL may optionally be used when delivering report output to FTP locations. All communications with the HSM cluster is over SSL. The sizes of SSL keys may be are restricted.

SSH may be used in multiple scenarios. A report output may be delivered to SCP/SFTP locations. R3 also may use SSH to create a tunnel to communicate with the Hadoop job tracker node running in the distributed storage service because by default the job tracker only listens for connections from localhost, so a Java SSH library may be used to create an SSH tunnel to the job tracker node. The tunnel to port is configured to forward to port 9001 on the remote node (the default Hadoop job tracker port) and connect a Hadoop job tracker client to the local tunnel endpoint. This permits periodic checking of the status of jobs running in the type of computer service that implements a MapReduce programming model, and retrieval of details about the job's progress, etc.

The distributed storage service uses MD5 as a checksum referred to as the "ETag" of an object. The MD5 hash of data uploaded to the distributed storage service is checked against the MD5 hash computed when storing data to ensure upload integrity.

SHA-256 is used to hash user passwords and when storing data in the distributed storage service. A hash of the original data before compression and encryption is computed and stored in the manifest of the file uploaded to the distributed storage service.

AES-256 is used when encrypting sensitive configuration data in the database such as remote delivery credentials, etc. Keys are stored in the HSM cluster, and the key token is stored in a configuration file. AES-256 may also be used for encrypting data uploaded to the distributed storage service, and when writing intermediate and final output data in Hadoop jobs. Standard Java cryptography libraries may be used. AES may be used in AES/CBC/PKCS5 Padding mode with randomly generated initialization vectors. JCE Unlimited Strength policy files may be used to enable large key sizes in the JDK.

HTTPS may be used extensively. All Web GUI traffic is over HTTPS, as is all web service API traffic. All calls to distributed storage service APIs are over HTTPS as are all calls to the distributed storage service storage. Inbound connections to the Web GUI and service APIs is preferably restricted to only allow a approved set of ciphers and key lengths. FTP is supported as a configuration option for remote delivery of report output. For example, the Apache Commons Net libraries may be used to support this protocol. FTP over SSL (FTPS) is supported as a configuration option for remote delivery of report output. SCP/SFTP is supported as a configuration option for remote delivery of report output, e.g., using the JSCH SSH library. SMTP is used to send out report results as attachments if a client so requests.

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in a web services provider distributed storage service context, the principles of the technology described may also be applied to other distributed processing and storage systems and services. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method implemented in an information processing system including one or more data processors, the method comprising:
provisioning, by the information processing system, a client account for a user to enable a client computer associated with the user to store information in an elastic storage system and to prohibit the client computer, the information processing system, and the elastic storage system from altering and from deleting the stored information during an authorized retention period;
receiving at the information processing system data messages sent via one or more communications networks from one or more client computers, the received data messages including information that is required to be stored for the authorized retention period;
transmitting, from the information processing system, the received information via the one or more data communications networks to the elastic storage system for storage so that the stored information is non-rewriteable and non-erasable during the authorized retention period;
in response to an authorized access request from an authorized computer device, the information processing system transmitting a retrieval request message to the elastic storage system via the one or more communication networks to retrieve a copy of the information stored in the elastic storage system;
wherein the provisioning step includes the information processing system configuring the elastic storage system to permit deletion, modification, or destruction of the stored information only when a trusted third party having a predetermined authentication information associated with the client account provides the predetermined authentication information to the elastic storage system,
wherein the trusted third party is an entity independent from and not controlled by the user, the information processing system, or the elastic storage system, and
wherein the elastic storage system is a cloud-based storage system providing shared computing and storage services and the information is financial information.

2. The method in claim 1, wherein the predetermined authentication information is a multi-factor authentication token.

3. The method in claim 1, wherein the client device, the information processing system, and the elastic storage system do not include or have access to the predetermined authentication information.

4. The method in claim 1, wherein the information processing system ensures that the financial information is processed and stored in compliance with Securities and Exchange Commission (SEC) Rule 17a-4.

5. The method in claim 1, wherein the information processing system ensures that the financial information is processed and stored in compliance with Commodity Futures Trading Commission (CFTC) Rule 151.

6. The method in claim 1, further comprising accessing the cloud-based storage system over the one or more communications networks.

7. The method in claim 6, wherein the information processing system is operated by a financial services entity and the cloud-based storage system is operated by different entity that provides shared computing and storage services to achieve economies of scale.

8. The method in claim 1, further comprising:
encrypting the information and then providing the encrypted information to the elastic storage system to facilitate secure persistent storage of the information.

9. The method in claim 1, wherein the information is received encrypted based on one or more first encryption keys associated with the user and the client computer, the method further comprising:
decrypting the received information based on the one or more first encryption keys;
re-encrypting the decrypted information based on one or more second different encryption keys;
transmitting the information encrypted with the one or more second different encryption keys to the elastic storage system for storage in encrypted format.

10. The method in claim 1, wherein the information is financial information related to financial articles of trade that are tradable on one or more financial markets and including emails, user statements, trade confirmations, memos, electronic log files, PDF files, or instant messages.

11. The method in claim 1, further comprising:
   storing a date or time of storage of the information in the elastic storage system, and
   linking the stored date or time to the information.

12. The method in claim 1, wherein the retrieving step is performed as part of an audit of the client account.

13. The method in claim 1, further comprising:
   storing in a database metadata linked to the information;
   in response to the authorized request, accessing metadata from the database that is potentially relevant to the authorized request; and
   using the accessed metadata for retrieval of the copy of the information stored in the elastic storage system.

14. The method in claim 13, wherein the metadata includes a unique identifier associated with the information and a date or time of storage of the information in the elastic storage system.

15. The method in claim 1, further comprising:
   tracking in a log file information and activities associated with the information in the information processing system and in the elastic storage system.

16. A secure information processing system comprising:
   one or more hardware data processors configured to communicate with a client computer associated with a user, to communicate with a cloud computing and storage platform via a communications network, and configured to:
   provision a client account for the user to enable the client computer to store information in an elastic storage system and to prohibit the client computer, the information processing system, and the elastic storage system from altering and from deleting the stored information during an authorized retention period;
   receive data messages sent via one or more communications networks from one or more client computers, the received data messages including information that is required to be stored for the authorized retention period;
   transmit the received information via the one or more data communications networks to the elastic storage system for storage so that the stored information is non-rewriteable and non-erasable during the authorized retention period;
   in response to an authorized access request from an authorized computer device, retrieve a copy of the information stored in the elastic storage system, and
   wherein the one or more hardware data processors configure the elastic storage system to permit deletion, modification, or destruction of the stored information when a trusted third party having a predetermined authentication information associated with the client account presents the predetermined authentication information to the elastic storage system,
   wherein the trusted third party is an entity independent from and not controlled by the user, the information processing system, or the elastic storage system, and
      wherein the elastic storage system is a cloud-based storage system that provides shared computing and storage services and the information is financial information.

17. The secure information processing system in claim 16, wherein the client device, the information processing system, and the elastic storage system do not include or have access to the predetermined authentication information.

18. The secure information processing system in claim 16 configured to ensure that the information is processed and stored in compliance with Securities and Exchange Commission (SEC) Rule 17a-4.

19. The secure information processing system in claim 16, wherein the elastic storage system is a cloud-based storage system accessible over the one or more communications networks.

20. The secure information processing system in claim 16, wherein the one or more hardware data processors are further configured to:
   encrypt the information and then providing the encrypted information to the elastic storage medium to facilitate secure persistent storage of the information.

21. The secure information processing system in claim 16, wherein the information is received encrypted using one or more first encryption keys associated with the user and the client computer,
   wherein the one or more hardware data processors are configured to decrypt the received information using the one or more first encryption keys,
   wherein one or more hardware data processors are configured to re-encrypt the decrypted information using one or more second different encryption keys, and
   wherein the one or more hardware data processors are configured to:
   transmit the information encrypted with the one or more second different encryption keys to the elastic storage system for storage in encrypted format.

22. The secure information processing system in claim 16, wherein the financial information is related to financial articles of trade that are tradable on one or more financial markets and including emails, user statements, trade confirmations, memos, electronic log files, PDF files, or instant messages.

23. The secure information processing system in claim 16, wherein the one or more hardware data processors are configured to:
   store in a database metadata linked to the information;
   in response to the authorized request, access metadata from the database potentially relevant to the authorized request; and
   use the accessed metadata for requested retrieval the copy of the information stored in the elastic storage system.

24. The secure information processing system in claim 23, wherein the metadata includes a unique identifier associated with the information and a date or time of storage of the information in the elastic storage system.

25. The secure information processing system in claim 16, wherein the one or more hardware data processors are configured to track in a log file information and activities associated with the information in the information processing system and in the elastic storage system.

26. The secure information processing system in claim 16, wherein the one or more hardware data processors includes multiple data processors divided into a user interface tier, a processing tier, a database tier, and an encryption management tier.

27. A financial information processing system comprising:
   a secure data center including one or more hardware data processors configured for communication with user communication devices;

a cloud computing and storage platform including a shared infrastructure of multiple computing and storage resources connected by one or more networks and providing shared computing and storage services; and one or more data communications networks providing data communication between the secure data center and the cloud computing and storage platform, wherein:

the secure data center is configured to:

provision a client account for the user to enable the computer to store financial information in the cloud computing and storage platform and to prohibit user communication devices, the secure data center, and the cloud computing and storage platform from altering and from deleting the stored financial information during an authorized retention period;

receive data messages sent via the one or more data communications networks from one or more client computers, the received data messages including financial information that is required to be stored for the authorized retention period;

transmit the received information via the one or more data communications networks to the cloud computing and storage platform;

transmit a retrieval request message for the stored financial information to the cloud computing and storage platform via the one or more data communications networks in response to an authorized access request from an authorized user communication device, the cloud computing and storage platform configured to:

store the financial information transmitted by the secure data center in memory that is non-rewriteable and non-erasable during the authorized retention period;

retrieve a copy of the stored financial information in response to receiving the retrieval request message;

receive a request to delete, modify, or destroy the stored financial information, and if that request is accompanied by a predetermined authentication information associated with the client account and entrusted to a third party, then to perform the requested deletion, modification, or destruction of the stored financial information, wherein the third party is an entity independent from and not controlled by users, the secure data center, or the cloud computing and storage platform.

28. The financial information processing system in claim 27 configured to ensure that the financial information is processed and stored in compliance with Securities and Exchange Commission (SEC) Rule 17a-4.

29. The financial information processing system in claim 27, wherein the financial information is encrypted when received by the cloud computing and storage platform, and wherein the cloud computing and storage platform is configured to provide secure persistent storage of the encrypted financial information.

* * * * *